March 31, 1936.  C. P. OWENS  2,035,503
METER TEST BLOCK
Filed Aug. 23, 1933
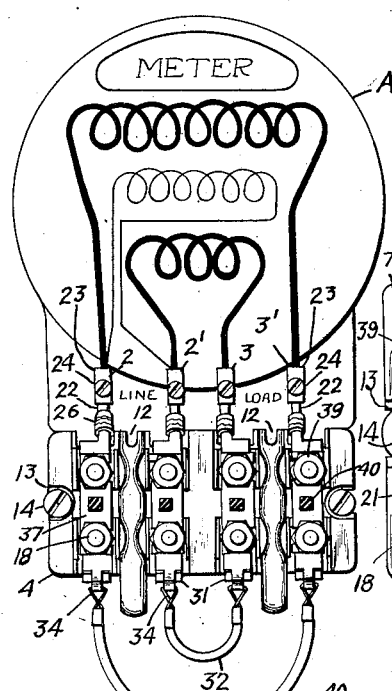
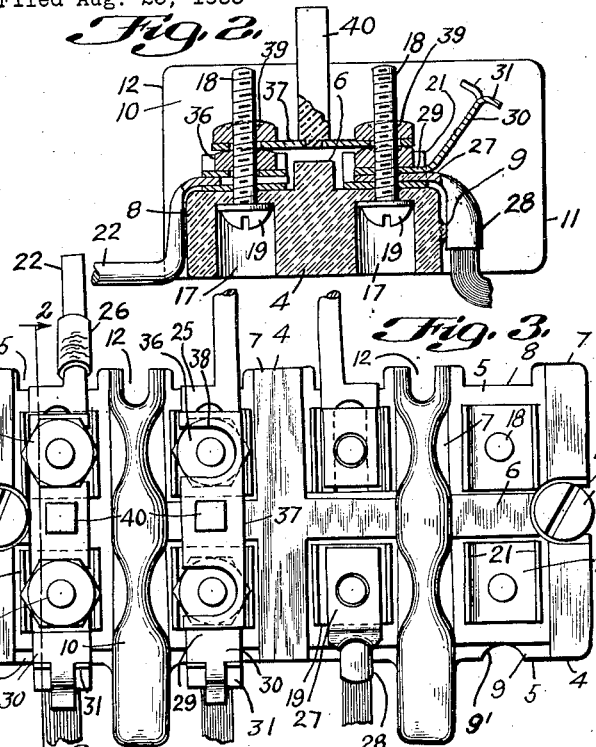
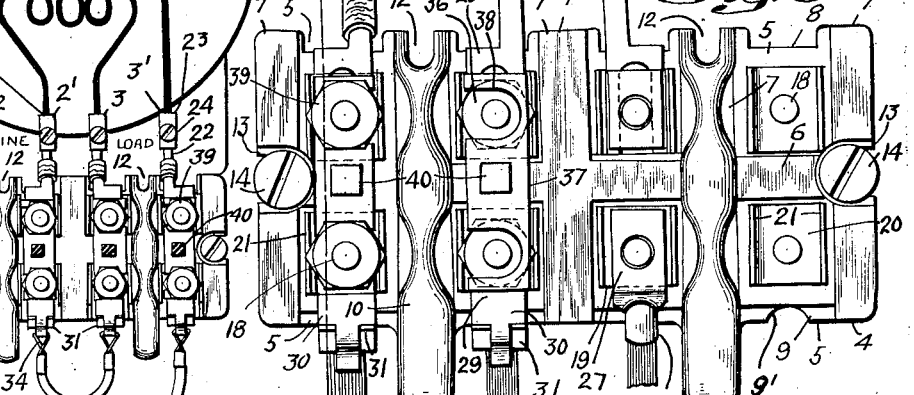
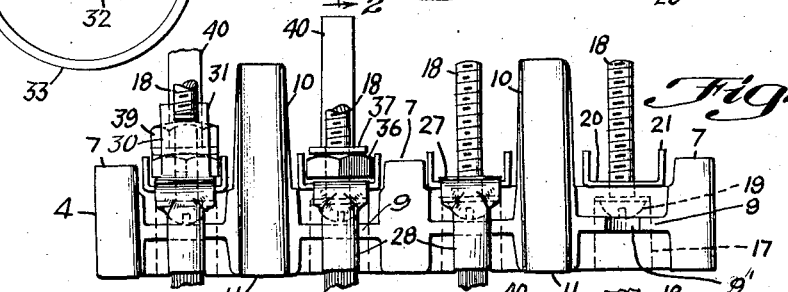
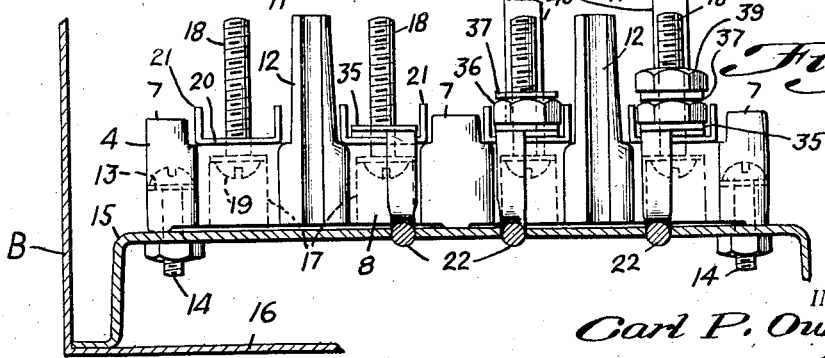
INVENTOR.
Carl P. Owens
BY
ATTORNEY.

Patented Mar. 31, 1936

2,035,503

UNITED STATES PATENT OFFICE 2,035,503

METER TEST BLOCK

Carl P. Owens, Glenside, Pa., assignor to Heinemann Electric Company, Trenton, N. J., a corporation of Pennsylvania Application August 23, 1933, Serial No. 686,462

9 Claims. (Cl. 175—183)

My invention is a meter test block and assembly for connecting a plurality of line terminals and a plurality of load terminals of a meter with line conductors and load conductors of a circuit through terminals and detachable links arranged in the same sequence as, and in substantial alignment with, the meter terminals. Such arrangement obviates any crossing of conductors connecting block terminals and meter terminals; obviates any crossing of links or conductors connecting block terminals with one another when the meter is in the circuit, and obviates any crossing of conductors detachably connected with the block terminals to supply current directly to the load lines when the meter is cut out of circuit by removal of the detachable links. The links and terminals of the block forming parts of the supply lines are separated from one another by an insulating barrier and the links and terminals of the block forming parts of the load lines are separated from one another by a barrier so that there is no danger of a flash over or accidental short circuit from a line of one polarity to a line of opposite polarity.

In the preferred embodiment of my invention, an insulating base or panel is provided with surface recesses or terminal-receiving seats, adjacent to, and spaced along, parallel edges. The seats along one edge are aligned across the panel with seats along the opposite edge.

Barriers project from the face or front side of, and extend across, the panel and separate the elements of one polarity from the elements of opposite polarity of the line conductors and separate elements of one polarity from the elements of the opposite polarity of the load conductors. The end of these barriers may be substantially flush with the edge of the panel base at its meter side and preferably project beyond the opposite edge of the panel. The flush-edges of the barrier may be made of undulate section to minimize surface creepage.

Threaded binding posts, having heads engaging the back of the panel, extend through apertures in the panel adjacent to the centers of the seat-forming recesses. Each binding post passes through a channeled locking element, one or more terminal elements, nuts for securing the terminal elements, detachable links, and nuts for securing the links.

The locking elements preferably consist of rectangular blanks having upturned edges forming channels which are non-rotatably seated in the panel recesses and prevent the rotation of the terminal elements.

The terminal elements preferably have bifurcated ends yoked on the bolts and secured in place by threading the bolts through the binding nuts until the bifurcated members are tightly clamped between the nuts and the bases of the locking elements. The terminals disposed along the edge of the block adjacent to the meter have conducting members integrally formed with and projecting from the bifurcated sections thereof. These members connected with the line terminals may be offset in one direction from the centre line of their yokes and the members connected with the load terminals may be offset in the opposite direction from the centre lines of their yokes so as to align these members with the meter terminals while maintaining adequate electrostatic clearance between members of different potentials.

Each post along the edge of the block remote from the meter has thereon a terminal containing a socket for receiving a line conductor or a load conductor and a second terminal projecting angularly from the first terminal for the attachment of clips on the ends of conductors for maintaining the flow of current through the load conductors when the meter is out of circuit. Both terminal elements may be held against turning by flanges of the locking elements and are clamped in position by a binding nut threaded on the binding post.

The links connecting the binding posts on opposite sides of the block or panel each consists of a conducting strip having notched edges permitting the link to be moved laterally on to and off of the binding posts above the terminal binding nuts by means of a non-conducting stem or handle normal to the top surface of the link. These links are secured in place on the binding posts by nuts threaded thereon.

If desired, edges of the block extending normal to its face may be grooved or channeled for the reception of sections of the terminal elements standing parallel to the binding posts so as to maintain such elements against displacement.

The characteristic features and advantages of my improvements will further appear from the following description and the accompanying drawing in illustration thereof.

In the drawing, Fig. 1 is a diagrammatic front elevation of a meter-box testing block and assembly embodying my invention; Fig. 2 is an enlarged view taken substantially along the line 2—2 of Fig. 3; Fig. 3 is an enlarged front elevation of the block, as viewed in Fig. 1, with parts removed; Fig. 4 is a bottom edge view of the structure shown in Fig. 3; and Fig. 5 is a top edge view of my improved block mounted on a bridge carried by a meter-box wall.

In the drawing, there is shown a conventional meter A mounted in a meter box B and having line terminals 2, 2' of opposite polarities and load terminals 3, 3' of opposite polarities disposed in the sequence, line, line, load, load, from left to right, as viewed from the front or open-door position so that the sequence of polarities of the terminals may be considered to be positive, negative, negative, positive.

In accordance with my invention there is mounted in the box B, adjacent to the meter terminals, a so-called "test block" having an insulating base 4 of molded or ceramic material. The block is suitably of oblong panel shape of substantial thickness and is disposed with one of its longer edges across the bottom of the meter A.

Two sets of quadrature-related recesses 5, preferably of rectangular shape, are formed on the front face of the base 4, by longitudinally and laterally disposed ribs or partitions 6 and 7. Recesses 8 may also be formed along the upper edge of the block by projecting ends of the ribs 7, and curved recesses 9' may be formed in the webs 9 projecting from the lower edge of the block intermediate the thickness thereof.

Barriers 10 project from two of the low partitions 7 and project but little from the meter-side edge of the base but extend considerably beyond the opposite side edge of the base. The barriers have extensions 11 projecting across the bottom edge to the rear of the base, as indicated more clearly in Fig. 2.

The meter-side edges 12 of the barriers 10 may be of undulated section to provide a greater surface-creepage distance than the thickness of the barrier without extending the barriers substantially beyond the top edge of the block, so that the body of the base may be placed close to the meter.

The base also has end-recesses provided with shoulders 13 for the engagement of bolts 14 for attaching the base to a sheet metal bridge 15 which is mounted on a wall 16 of the meter box A.

Countersunk apertures 17 are moulded in the block for the reception of threaded binding-posts 18 having heads 19 engaging the bottom of the countersinks and shanks projecting through the base adjacent to the centres of the rectangular recesses 5.

Locking elements 20 are seated in the recesses 5 and are preferably formed from blanks of sheet-metal, such as copper, cut and bent to rectangular plan and substantially channel section with their flanges 21 projecting upwardly from the base.

Conducting strips 22 have ends secured by screws 24 in sockets 23 of the meter terminals 2, 2', 3, 3'. The opposite ends of the conducting strips are flattened to form yokes 25 having an arm projected laterally from one side of the conducting strips. These bifurcated members 25 embrace the binding-posts 18 and lie between the flanges 21 of the locking elements 20. If desired, the conducting strips 22 may be bent, as illustrated in Fig. 2, so that sections thereof lie parallel with the upper edge of the block and may be sheathed in an insulating collar 26.

The laterally extended arms of the yokes 25 of the conductors attached to the line terminals 2, 2' of the meter preferably lie on the left of such conductor, while the laterally extended arms of the yokes 25 formed on the conductors attached to the load terminals 3, 3' of the meter preferably lie on the right of such conductors as shown in Fig. 1. This permits adequate spacing of the seats in the block without diminishing the electrostatic clearance between the conductors of different potentials.

The binding posts 18 along the edge of the block remote from the meter have sleeved thereon terminals consisting of apertured sections 27 disposed between flanges 21 of locking devices 20 and socket portions 28 bent at right angles to the section 27 and lying in recesses 9' in the fins and projecting from the lower edge of the block; these sockets being spaced from the body of the block by these recessed fins or ribs 9.

Shunt terminals, comprising apertured plates 29 sleeved on the posts 18 and diagonal extensions 30 projecting therefrom and terminating in oppositely projecting lugs 31, provide means for the attachment of spring clips 34 which are fixed to the ends of shunt conductors 32 and 33.

Normally each pair of binding posts on opposite sides of the block is connected by a flat link 37 having notches 38 in the edges thereof to permit the links to be slid laterally on the binding posts under the nuts 39, which may be screwed down to securely hold the links in place when it is desired to maintain the meter in the circuit. Non-conducting finger pieces or handles 40 are swaged in apertures in the links and project normal to the face of the links to facilitate manipulation of such links in attaching or detaching them from the binding posts.

By engaging the clips 34 of a shunt conductor 32 with the line terminal and load terminal between the barriers 10 and by connecting the clips 34 on a shunt conductor 33 with the line terminal and load terminal outside of the barriers 10, current flow through the load lines may be maintained when the meter is cut out of circuit by disengaging the links 35 from the binding posts.

Having described my invention, I claim:

1. A meter test block comprising an insulating base having seats and a barrier between the seats, and connecting terminals having body portions on the seats and portions projecting from the body portions and beyond the barrier substantially parallel to each other, one of said projections being offset laterally from the center line of its body parallel with such projection.

2. A meter test block comprising an insulating base, means forming conductors across such base from a plurality of conductors beyond one side to complementary conductors beyond the opposite side of the base, and barriers extending between conductors first named and projecting from the base at said one edge thereof and having an end of undulated section adjacent to the opposite edge of said base.

3. A meter test block comprising an insulating panel having sets of surface seats along the portion thereof adjacent to the meter and along the portion thereof remote from the meter and seats complementary to the seats of one of said sets extending across an edge toward the base of the panel, terminals in said surface seats, links connecting the terminals of the sets, and conductor members projecting from said surface seats and disposed in said edge seats.

4. A meter test block comprising an insulating base having rectangular surface recesses, sheet metal elements of channel section fitting the recesses, nuts in the channels, binding posts having heads at the rear of the base and projecting through said elements and said nuts, links connecting the posts, and nuts on the posts for holding the links.

5. The combination with a meter having terminals arranged in the sequence "line", "line", "load", "load" of a block having terminals along one edge thereof adjacent the meter arranged in the sequence "line", "line", "load", "load" and a set of terminals arranged along the opposite edge thereof remote from the meter arranged in the sequence "line", "line", "load", "load", bolts passing through said block, each of said bolts passing through one of said terminals, a nut on each bolt along the meter edge of the block and securing a terminal to the base, a jumper-connector and a nut on each bolt along the edge of the block remote from the meter, said last named nuts securing to the base the terminals and jumper-connectors along the edge of the block remote from the meter, links each connecting a post along one edge of the block directly with the post along the opposite edge of the block, said links resting against the tops of the nuts securing said terminals, and nuts on said posts securing said links independently of the terminals, a barrier projecting from said block between the first and second links and a barrier projecting from said block between the third and fourth links.

6. A meter test block comprising an insulating base, a set of terminals disposed along the meter side of the base for connection to the meter terminals and in the same sequence of line, line, load, load, as the latter, a set of terminals disposed along the opposite side of the base and in the same sequence as the first named set from the same end of the base, a bolt securing each of said terminals to said base, a circuit making and breaking member connecting each terminal of one set on the base with the corresponding terminal of the other set on the base by engagement of such members with the respective bolts securing such terminals, and nuts on said bolts securing the terminals to the base independently of said members.

7. A meter test block comprising an insulating base, posts spaced along the meter side of the base, posts spaced along the opposite side of the base, links having side slots and movable into yoked relation with complementary posts of the sets by approach of the links laterally of the posts, an insulating handle projecting from each link between its slots, a terminal on each of said posts, and a nut on each of said posts securing the terminal thereon to the base independently of the links.

8. A meter test block comprising an insulating base, posts spaced along the meter side of the base, posts spaced along the opposite side of the base, a terminal on each of said posts, a jumper connection on each of the second mentioned group of posts, nuts for securing said terminals and connections on said posts, parallel links connecting the posts along the meter side of the base in pairs with those on the opposite side of the base, and a nut on each of said posts securing said links in place.

9. A meter test block comprising an insulating base, posts spaced along the meter side of the base, posts spaced along the opposite side of the base, a terminal on each of said posts, a jumper connection on each of the posts in the second mentioned group of posts, said connections extending downwardly and outwardly from their respective posts and the terminals on the posts with jumper connections spaced from said connections, a nut on each of said posts securing the terminals and jumper connections thereon, parallel links above said nuts connecting the posts on the meter side of the base in pairs with the posts on the opposite side of the base, and nuts on the posts for holding said links in place.

CARL P. OWENS.